Oct. 21, 1952     J. K. FARRELL     2,614,574
CHEMICAL FEEDER AND METHOD OF FEEDING

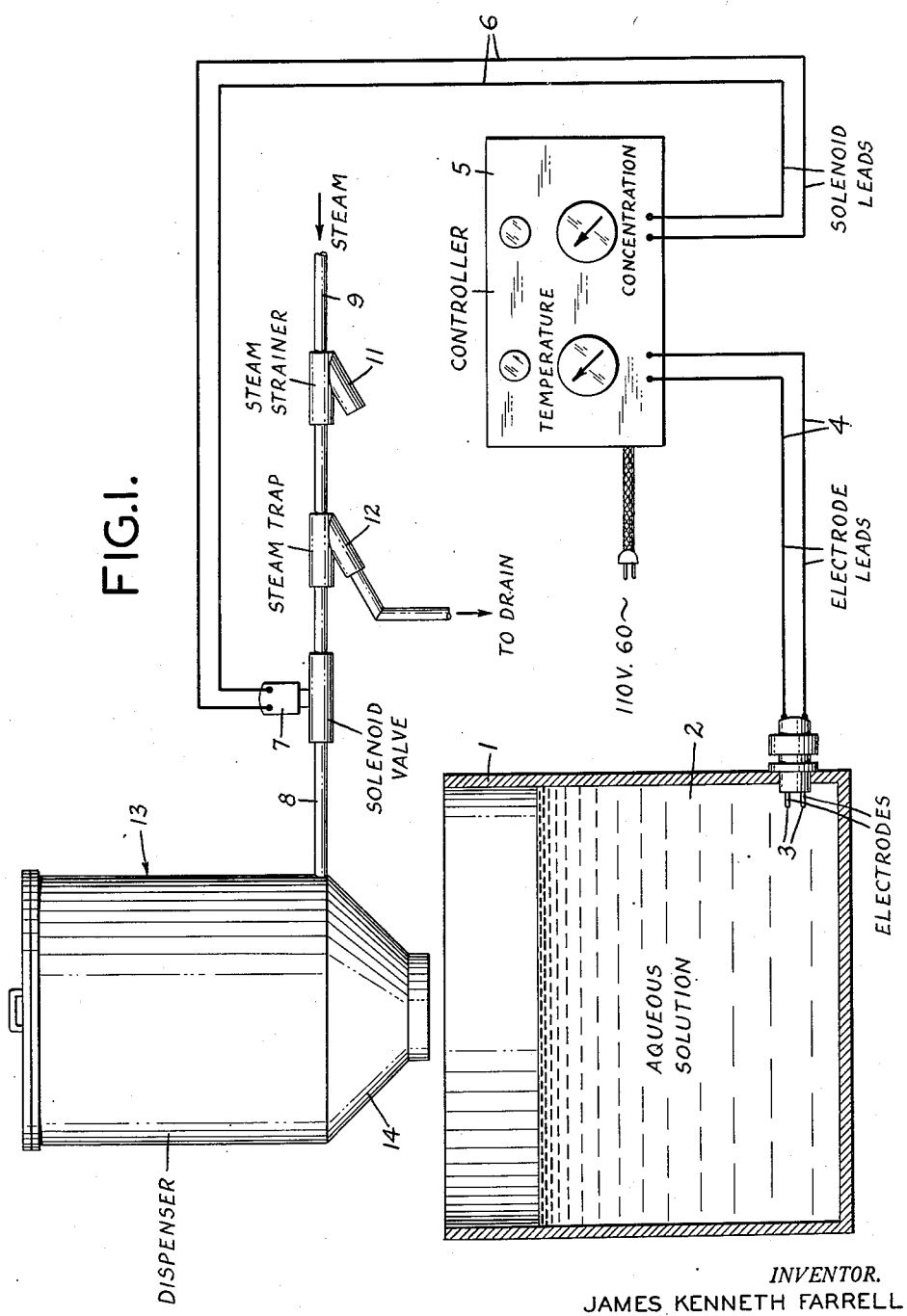

Filed April 12, 1948     2 SHEETS—SHEET 2

INVENTOR.
JAMES KENNETH FARRELL
BY Alvin Engelstein
ATTORNEY.

Patented Oct. 21, 1952

2,614,574

UNITED STATES PATENT OFFICE 2,614,574

CHEMICAL FEEDER AND METHOD OF FEEDING

James Kenneth Farrell, Syracuse, N. Y., assignor to Allied Chemical & Dye Corporation, New York, N. Y., a corporation of New York Application April 12, 1948, Serial No. 20,578

11 Claims. (Cl. 137—93)

This invention relates to dispensing water-soluble solids and more particularly refers to a new and improved method and apparatus for feeding controlled amounts of caustic detergents to maintain the caustic concentration in a bath at a desired concentration.

The control of caustic solutions for washing bottles, peeling of fruits and vegetables, and the swelling of wood bolts for pulping has presented a difficult problem for many years. Most States have enacted rigid laws to control the washing of bottles used by the public for such products as milk, soft drinks and beer. Up to the present time there has been no satisfactory method of controlling the caustic concentration in soaker tanks of bottle washers. The problem is a difficult one for a number of reasons. The concentration used in these tanks is relatively high, running from 2% to 5% depending on the particular State law. Such high concentrations are difficult to maintain by any type of feeder which operates mechanically or on a constant flow basis. Neither of these types of feeder has proved successful because they are not uniform in their delivery characteristics and because of variable demand for make up alkali. A further objection is that excess water in the form of caustic solution results in the loss of valuable caustic by overflow since the water make up required in even a large bottle washing machine rarely amounts to more than 150 gallons per 24 hours. Because of these and other difficulties, it is the practice to attempt to maintain the required concentration by means of frequent manual buck-up of the solution with solid caustic alkalies.

Manual control of the caustic concentration is obviously undesirable. The safety hazard involved in handling large amounts of solid or flake caustic alkali at frequent intervals is one that all bottlers would prefer to avoid. The practice is wasteful in that frequently the soaker tank is permitted to drop to a concentration below that which produces optimum cleaning and then the whole volume is brought up to a concentration well above that necessary. In fact in many cases the concentration is made so high that actual attack of the bottles by the caustic results. These wide swings in concentration are the inevitable result of the attempts of the operating personnel to save time.

Manual control for introduction of lye into apparatus for peeling fruit and vegetables has the same inherent difficulties to a greater degree as those involved in controlling the caustic concentration in bottle washing machines. If the lye concentration is higher than required, it impairs the quality of the treated fruits and vegetables, whereas if the lye concentration drops to too low a point the fruit and vegetables are inadequately treated, requiring either further treatment or wastage.

The addition of solid caustic alkali to solutions for maintaining the proper concentration therein by means of an automatic feeder presents a number of serious problems, particularly that of designing and operating a dispenser which will measure out regulated amounts of caustic to maintain the required concentration in the solution in accordance with the depletion of caustic from the solution. The hygroscopic nature of caustic compounds in general and the highly humid conditions surrounding the bottle washing machine or the peeling apparatus combine to complicate this problem. To my knowledge, no automatic chemical feeder of solids has been commercially employed for this purpose.

The addition of caustic solutions for make up purposes to alkali solutions employed in bottle washing machines and fruit and vegetable peeling apparatus is frequently objectionable. In the case of bottle washing or peeling of fruits, solutions having a high degree of caustic alkalinity are maintained without replacement over long periods of time. Many caustic type detergent compounds cannot be made up to more than 10% concentration because at room temperatures higher concentrations will crystallize or congeal. Thus, the volume of water added per unit of caustic results in more dilution than can be tolerated. Furthermore, the addition of dilute solutions of caustic results in the loss of caustic by overflow. The introduction of caustic solutions involves certain practical difficulties to be overcome such as keeping a control valve in operation with solutions which are liable to crystallize at the slightest drop in temperature. Other objections to the use of such caustic solutions are (1) the necessity for large tanks for which there may be no available space, and (2) the preparation of such solutions is messy and dangerous.

One object of the present invention is to provide an efficient method of feeding caustic detergents in regulated amounts to solutions requiring maintenance of concentration within narrow limits without substantially diluting the solutions.

Another object of this invention is to provide a simple economical dispenser for feeding highly concentrated caustic solutions to an aqueous bath in which the caustic is depleted responsive to an automatic control to maintain the caustic concentration in the bath within the desired limits.

Further objects and advantages of the invention will be apparent from the following description and accompanying drawings.

I have found that when steam in regulated amounts responsive to depletion of solute in an aqueous bath is introduced into a dispenser containing a water soluble hygroscopic solid for the purpose of forming highly concentrated solutions which pass directly into the aqueous bath to replenish the loss in solute therein, the aqueous bath may be maintained at a predetermined concentration within narrow limits with none of the serious difficulties attendant previous methods for maintaining a substantially constant concentration in a bath.

While I do not wish to predicate my invention on any theory, the following explanation will indicate the reasons for the manifold advantages of the present invention over the prior art.

(a) The quantity of caustic detergent fed into an aqueous bath in the present invention is determined by the amount of steam introduced into the dispenser containing solid caustic detergent and the passage of concentrated caustic solutions from the dispenser into the aqueous bath is accomplished through a large unobstructed path, whereas in the usual procedure the flow of caustic solutions is regulated at the outlet of the dispenser by means of valves or other impedances with consequent frequent plugging up of the passageway leading to the aqueous bath due to solidifying or congealing of the concentrated caustic solution.

(b) In any device for regulating the flow of fluids, particularly one which is responsive to a solution frequently varying in concentration, there is always a time lag resulting in overshooting the mark. By employing steam as a medium for forming concentrated caustic solutions much closer response of caustic feed to variations in concentration of an aqueous bath can be obtained. This will be apparent when it will be considered that the ratio by volume of one pound saturated steam to one pound water at 212° F. and atmospheric pressure is roughly 1600 to 1.

(c) Caustic solutions of higher concentration can be made by contacting steam with solid caustic compounds rather than water since the total heat content of steam is 1150 B.t.u. per pound, divided into 180 B.t.u. for sensible heat and 970 B.t.u. for latent heat of vaporization, as compared to the total heat content of 180 B.t.u. for water at 212° F. all of which is sensible heat. When either steam or water enters the dispenser there is a loss of heat due to radiation, convection or conduction. When hot water is introduced in contact with solid caustic compounds in a container, the resulting solution will drop in temperature since the sensible heat of the water and the heat of solution generated will quickly be dissipated resulting in solidification of concentrated caustic solutions therein unless large amounts of water are added which produce caustic solutions of low concentration. With steam there is available 970 B.t.u. per pound to compensate for heat losses before there is any drop in temperature.

(d) Steam rapidly forms concentrated caustic solutions when contacted with caustic solid due to the high heat content of steam and its large volume per unit weight and vapor condition which permit greater dispersion and better contact with the caustic solid. The time required for water to dissolve caustic solid to produce a concentrated caustic solution comparable with that made by steam is appreciably greater.

(e) Since highly concentrated caustic solutions are produced by contacting steam with caustic solid, stoppage of the flow of steam into the dispenser will cause a lowering of temperature therein with almost immediate solidification of the concentrated solution and discontinuance of discharge into the aqueous bath. When water is employed to dissolve caustic solid, the flow of caustic solution into the aqueous bath cannot be quickly terminated without a valve mechanism or other restriction and the difficulties attendant thereto.

In the accompanying drawings I have illustrated one embodiment of the invention by way of example, though it will be clear that the novel method may be carried out in other ways, and that the apparatus may be modified without departing from the scope and spirit of the invention.

This invention may be applicable for the maintenance of the concentration of aqueous solutions for purposes other than those cited herein. Illustrative examples of water-soluble solids suitable for use in the practice of my invention are caustic soda, soda ash, detergent compounds, potash and caustic potash.

Fig. 1 is a diagrammatic flow sheet of one method of practicing my invention.

Figure 3:
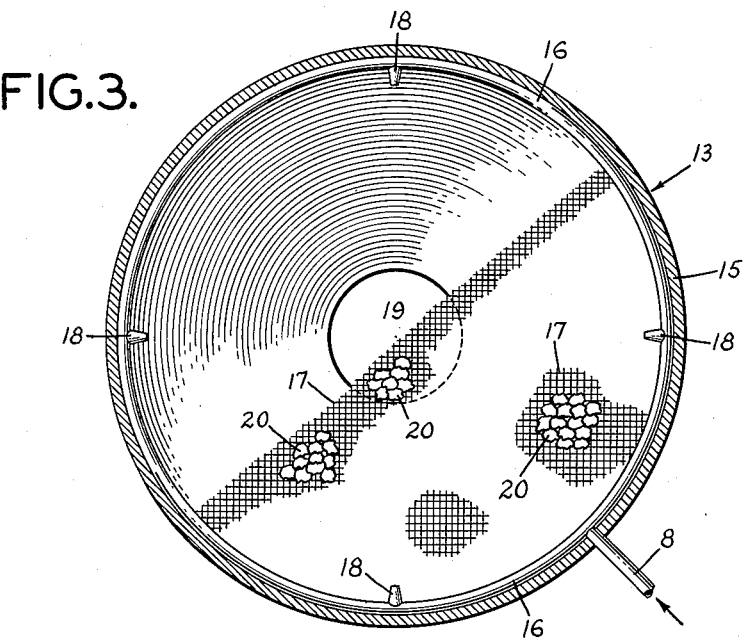
Fig. 3 is a sectional view taken on line 3—3 of Fig. 2 with a part of the screen cut away.

Referring to Fig. 1, tank 1 containing aqueous caustic solution 2 represents a soaker tank of a bottle washer or machine for peeling fruits and vegetables. Inserted in the body of caustic solution 2 are electrodes 3 which measure the resistance between the contact points of the electrodes. The solution resistance between the electrode contacts forms one arm of a Wheatstone bridge in the control circuit. During the operation of the bottle washer or peeling machine the caustic concentration in solution 2 decreases either through consumption or dilution resulting in an increased resistance between the contact points of electrodes 3. The increase in resistance is transmitted by electrode leads 4 to controller 5. As the bridge becomes unbalanced due to the increase in resistance resulting from the decrease in caustic concentration, the unbalance causes a relay in controller 5 to be operated electronically which in turn through solenoid leads 6 operates solenoid valve 7 interposed in steam line 8. Steam from any suitable external source is supplied through conduit 9, strained to remove foreign matter in steam strainer 11, passed through steam trap 12 to separate the steam from the condensed water and thence flows through solenoid valve 7 through line 8 into dispenser 13.

Figure 2:
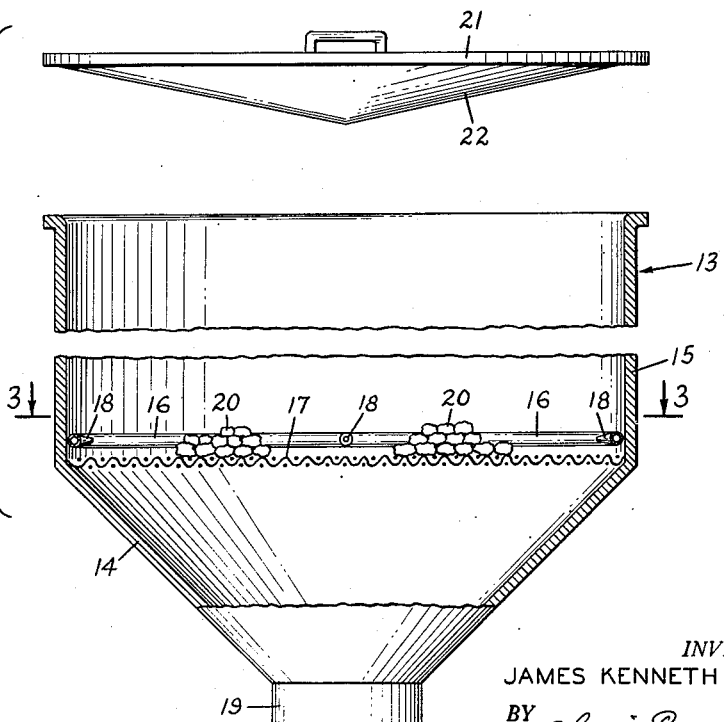
Fig. 2 is an exploded partial section of a front elevation of the dispenser showing a preferred form of cover disengaged from the dispenser.

The operation of solenoid 7 permits steam to enter the steam distributing ring 16 shown in Figs. 2 and 3 from which it issues through steam jets 18. The steam then contacts the solid caustic compound in container 13. The heat of wet steam and the heat of solution of the caustic causes the formation of a highly concentrated solution of the caustic compound, usually 60–70%, which passes through the screen and out through the conical bottom section 14 into caustic solution 2 contained in solution tank 1. The addition of the concentrated caustic solution to caustic solution 2 causes a gradual decrease in the resistance across contacts of electrodes 3. This decrease in resistance finally reaches a point where balance of the Wheatstone bridge in the control circuit is again restored and the relay in controller 5 actuating solenoid valve 7 is released thereby stopping the steam flow to dispenser 13. Since the concentration of the caustic solution issuing from dispenser 13 is very high, as soon as the steam ceases to flow the caustic solution solidifies almost immediately thereby reducing overshooting of the concentration of aqueous solution 2 in tank 1 to a minimum.

Although not a preferred method of operation, the introduction of steam into dispenser 13 may be regulated by manual manipulation of a valve in line 8.

Fig. 2 is a front view of dispenser 13 with conical base 14 showing in section steam distributing ring 16 and steam jets 18 placed immediately above screen 17 supporting solid caustic compound 20. Concentrated caustic solution passing through screen 17 flows downwardly by gravity through unobstructed conical section 14 out through enlarged opening 19 into caustic solution 2 immediately below. Cover 21 for enclosing dispenser 13 is preferably provided with a shallow cone-shaped bottom 22 which permits the condensed moisture on its surface to drip down over the caustic from the center of the cover.

Fig. 3 illustrates in greater detail the construction of caustic dispenser 13 which comprises a cylindrical metal shell 15 and a steam distributing ring 16 disposed adjacent the internal periphery of shell 15 and immediately above screen 17. Steam enters ring 16 through conduit 8 and issues from the ring through four jets 18 which direct the steam in contact with solid caustic compound 20 supported by the screen. The concentrated caustic solution resulting from the mixture of steam and solid caustic discharges through the large opening 19 at the bottom of conical section 14.

To further illustrate the advantages of my invention, a series of tests were conducted on apparatus in the manner previously described in connection with Fig. 1 of the accompanying drawing. Solution 2 contained in tank 1 was constantly being depleted of caustic soda and then replenished with highly concentrated caustic soda solution from dispenser 13. It was found that three caustic soda solutions of different concentrations could be maintained within the following limits: 3.47%±0.12%, 5.65%±0.18%, and 17.38%±0.89%. These tests demonstrate that in the practice of my invention I can maintain caustic concentrations within very narrow limits, well within the range required by bottle washing and fruit peeling machines.

I claim:

1. A method for dispensing a controlled amount of hygroscopic solid which comprises introducing steam in contact with a hygroscopic solid of high solubility at higher temperatures in water maintained in a container and supported upon a perforated member, regulating the amount of steam introduced in accordance with the amount of said solid desired to be dispensed, whereby a concentrated aqueous solution of said solid is produced and flows through said perforated member, and upon termination of steam introduction solidifies on said perforated member terminating flow of aqueous solution therethrough, said dispenser being adapted to dissipate heat to cause drop in temperature and solidification of aqueous solution on perforated member, withdrawing said concentrated solution by gravity through an outlet in said container, and maintaining a continuous open passageway from the perforated member through the outlet of the container during discharging and non-discharging periods of dispensing concentrated solution.

2. A method for dispensing a controlled amount of hygroscopic caustic solid which comprises introducing steam in contact with a hygroscopic caustic solid maintained in a container and supported upon a perforated member, regulating the amount of steam introduced in accordance with the amount of said solid desired to be dispensed, whereby a concentrated aqueous solution of said solid is produced and flows through said perforated member, and upon termination of steam introduction solidifies on said perforated member terminating flow of aqueous solution therethrough, said dispenser being adapted to dissipate heat to cause drop in temperature and solidification of aqueous solution on perforated member, withdrawing said concentrated solution by gravity through an outlet in said container, and maintaining a continuous open passageway from the perforated member through the outlet of the container during discharging and non-discharging periods of dispensing concentrated solution.

3. A method for dispensing a controlled amount of caustic soda which comprises introducing steam in contact with solid caustic soda maintained in a container and supported upon a perforated member, regulating the amount of steam introduced in accordance with the amount of said solid desired to be dispensed, whereby a concentrated aqueous solution of said solid is produced and flows through said perforated member, and upon termination of steam introduction solidifies on said perforated member terminating flow of aqueous solution therethrough, said dispenser being adapted to dissipate heat to cause drop in temperature and solidification of aqueous solution on perforated member, withdrawing said concentrated solution by gravity through an outlet in said container, and maintaining a continuous open passageway from the perforated member through the outlet of the container during discharging and non-discharging periods of dispensing concentrated solution.

4. A dispenser for discharging a controlled amount of hygroscopic solid which comprises a container having a tapered bottom section open at its lower end, a perforated member in said container adapted to support a hygroscopic solid of high solubility at higher temperatures in water, a continuous open passageway from the perforated member through the outlet of the container, a steam distributing ring disposed a short distance above said perforated member, a plurality of jets extending from said ring to introduce steam into said container for contact with said hygroscopic solid, whereby a concentrated aqueous solution of said solid is produced and flows through said perforated member, and upon termination of steam introduction solidifies on said perforated member terminating flow of aqueous solution therethrough, said dispenser being adapted to dissipate heat to cause drop in temperature and solidification of aqueous solution on the perforated member, a steam inlet conduit having one end connected to said ring and its other end being adapted to be connected to a suitable supply of steam from an external source, a valve mechanism interposed in said steam inlet conduit adapted to regulate the amount of steam in said container until a predetermined amount of hygroscopic solid in solution is dispensed, and a cover for the top of said container.

5. A dispenser for discharging controlled amounts of hygroscopic solid of high solubility at higher temperatures in water which comprises a container having a cylindrical section open at its top end and a conical bottom section open at its lower end, a 12–16 mesh screen interposed between the cylindrical and conical sections to support said hygroscopic solid, a continuous open passageway from the screen through the outlet of the container, a steam distributing ring disposed immediately above said screen, said ring having a plurality of spaced jets pointing in a direction over said screen, whereby upon introduction of steam a concentrated aqueous solution of said solid is produced and flows through said screen and upon termination of steam introduction solidifies on said screen terminating flow of aqueous solution therethrough; said dispenser being adapted to dissipate heat to cause drop in temperature and solidification of aqueous solution on the screen, a steam inlet conduit extending out from said ring adapted to be connected to a suitable supply of steam from an external source, a valve mechanism interposed in said steam inlet conduit adapted to regulate the amount of steam introduced in said container until a predetermined amount of hygroscopic solid in solution is dispensed, and a detachably mounted cover having a cone-shaped bottom enclosing the top end of said container.

6. A method for controlling the concentration of an aqueous bath containing a hygroscopic solid as a solute which comprises introducing steam in contact with a hygroscopic solid of high solubility at higher temperature in water maintained in a container and supported upon a perforated member, whereby a concentrated aqueous solution of said solid is produced and flows through said perforated member, and upon termination of steam introduction solidifies on said perforated member terminating flow of aqueous solution therethrough, said dispenser being adapted to dissipate heat to cause drop in temperature and solidification of aqueous solution on the perforated member, passing said concentrated solution by gravity through an outlet in said container into a depleted aqueous bath, maintaining a continuous open passagaway from said perforated member through the outlet of the container during discharging and non-discharging periods of dispensing concentrated solution, and regulating introduction of amount of steam in said container in accordance with variations in concentration of said aqueous bath thereby maintaining said aqueous bath within narrow limits of a predetermined concentration.

7. A method for controlling the concentration of an aqueous bath containing caustic soda which comprises introducing steam in contact with solid cautsic soda maintained in a container and supported upon a perforated member, whereby a concentrated aqueous solution of said solid is produced and flows through said perforated member, and upon termination of steam introduction solidifies on said perforated member terminating flow of aqueous solution therethrough, said dispenser being adapted to dissipate heat to cause drop in temperature and solidification of aqueous solution on the perforated member, passing said concentrated solution by gravity through an outlet in said container into a depleted aqueous bath, maintaining a continuous open passageway from said perforated member through the outlet of the container during discharging and non-discharging periods of dispensing concentrated solution, and automatically regulating introduction of amount of steam in said container in accordance with variations in concentration of said aqueous bath thereby maintaining said aqueous bath within narrow limits of a predetermined concentration.

8. Dispensing apparatus for controlling the concentration of an aqueous bath containing a hygroscopic solid as a solute including in combination an aqueous bath, a pair of electrodes in said aqueous bath, a control circuit with a relay operatively responsive to changes in resistance between contacts of said electrodes resulting from changes in concentration of said aqueous bath, a solenoid valve actuated by said relay for regulating a flow of steam, a container having a tapered bottom section open at its lower end, a screen in said container adapted to support a hygroscopic solid of high solubility at higher temperatures in water, a steam distributing ring immediately above said screen, said ring having a plurality of spaced jets pointing in a direction over said screen, a steam conduit for conducting steam from said solenoid valve into said ring, whereby a concentrated aqueous solution of said solid is produced and flows through said screen, and upon termination of steam introduction solidifies on said screen terminating flow of aqueous solution therethrough, said dispenser being adapted to dissipate heat to cause drop in temperature and solidification of aqueous solution on the screen, and said container being disposed above the level of said aqueous bath whereby concentrated solutions of hygroscopic solid produced by the introduction of steam into said container pass by gravity through a continuous open passageway from the screen through the bottom opening of said container directly into said aqueous bath.

9. Dispensing apparatus for controlling the concentration of an aqueous bath containing a hygroscopic solid as a solute including in combination a container open at its lower end, a perforated member in said container adapted to support a hygroscopic solid of high solubility at higher temperatures in water, a continuous open passageway from the perforated member through the outlet of the container through which concentrated solution flows by gravity, a steam conduit for introducing steam above said perforated member in contact with said hygroscopic solid, whereby a concentrated aqueous solution of said solid is produced and flows through said perforated member, and upon termination of steam introduction solidifies on said perforated member terminating flow of aqueous solution therethrough, said dispenser being adapted to dissipate heat to cause drop in temperature and solidification of aqueous solution on the perforated member, an aqueous bath disposed beneath said perforated member to receive said concentrated solution, a valve mechanism in said steam conduit for regulating flow of steam into said container and control means actuating said valve mechanism effecting flow of steam into said container responsive to changes in concentration of said aqueous bath to maintain said concentration within narrow limits.

10. A method for maintaining the concentration of a solution in use and for dissolving a hygroscopic solid of high solubility at higher temperatures in water which comprises subjecting a bed of the solid maintained in a dispenser and supported upon a perforated member to the action of steam added in accordance with the response of a sensing device to the concentration of the aqueous solution whose concentration is to be maintained, whereby a concentrated aqueous solution of said solid is produced and flows through said perforated member, and upon termination of steam introduction solidifies on said perforated member terminating flow of aqueous solution therethrough, said dispenser being adapted to dissipate heat to cause drop in temperature and solidification of aqueous solution on the perforated member, and allowing the water solution of the solid to flow out of the dispenser through a continuous open passageway from the perforated member through an outlet of the dispenser by gravitational flow into the body of solution.

11. Dispensing apparatus for maintaining the concentration of a solution in use and for dissolving a hygroscopic solid in water including in combination a container open at its lower end, a perforated member in said container adapted to support a hygroscopic solid of high solubility at higher temperatures in water, a steam conduit for introducing steam above said perforated member in contact with said hygroscopic solid, whereby a concentrated aqueous solution on said solid is produced and flows through said perforated member, and upon termination of steam introduction solidifies on said perforated member terminating flow of aqueous solution therethrough, said dispenser being adapted to dissipate heat and cause drop in temperature and solidification of aqueous solution on the perforated member, an aqueous solution whose concentration is to be maintained disposed beneath said container, a continuous open passageway from the perforated member through the outlet of the container to permit the concentrated solution of solid to flow out of the container by gravitational flow into the aqueous solution and a sensing device adapted to regulate the introduction of steam to the container in accordance with the concentration of the aqueous solution whose concentration is to be maintained.

JAMES KENNETH FARRELL.

REFERENCES CITED

The following references are of record in the file of this patent:

UNITED STATES PATENTS

| Number | Name | Date |
| --- | --- | --- |
| 1,353,035 | Fairley | Sept. 14, 1920 |
| 1,500,096 | Oxley | July 1, 1924 |
| 1,861,058 | Jaenecke | May 31, 1932 |
| 2,058,300 | Cramer | Oct. 20, 1936 |
| 2,377,363 | Noble | June 5, 1945 |